April 4, 1950          W. S. CASE          2,502,925
CONNECTOR UNIT FOR TIE ROD ENDS
Filed Dec. 9, 1947
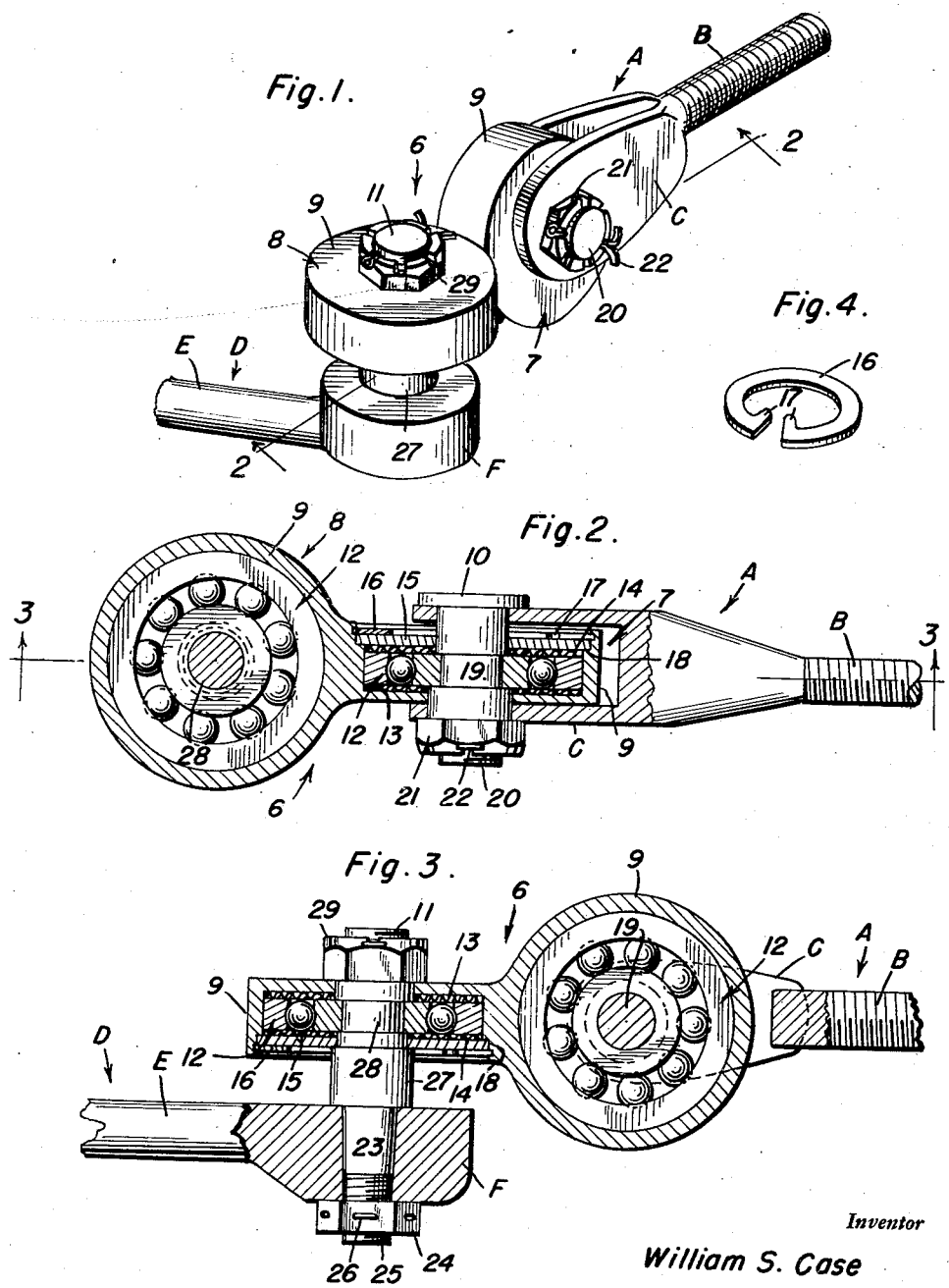
Inventor
William S. Case
By *Clarence A. O'Brien and Harvey B. Jacobson*
Attorneys Patented Apr. 4, 1950

2,502,925

UNITED STATES PATENT OFFICE 2,502,925

CONNECTOR UNIT FOR TIE ROD ENDS

William S. Case, Ardmore, Okla.

Application December 9, 1947, Serial No. 790,531

1 Claim. (Cl. 287—93)

The present invention relates to an improved connector unit through the medium of which a more satisfactory and suitable connection is made between a tie rod end-member and a coacting front wheel knuckle arm, and the object of the invention is to provide a connector unit which, while it insures positive and resultful steering, also allows for independent front wheel actions in a manner to relieve the tie rod, drag link and other coacting parts of undue stresses and strains.

Another object of the invention is to provide connector units of the nature referred to which are in themselves strengthened assurance that the linkage connections between respective steering knuckle arms and the tie rod end-members are positive and reliable under all road and driving conditions and are, at the same time, sufficiently adaptable and flexible to accommodate and compensate for relative independent front wheel maneuvers.

In carrying out the preferred embodiment of the invention I provide a simple and practical connector unit characterized by a pair of coacting anti-friction bearing equipped cups or cases, these being at right angles to each other and each being provided with a freely turnable stud, one stud affording a separable connection between a tie rod end unit and the coacting case, and the remaining stud providing a connection between the remaining case and complemental knuckle arm.

Other objects and advantages will become more readily apparent from the following description and the accompanying illustrative drawings.

In the drawings:

Figure 1 is a perspective view showing certain of the old parts and the improved connector unit constructed in accordance with my ideas and linking said old parts together for improved operational results;

Figure 2 is a view in section and elevation taken approximately on the plane of the line 2—2 of Figure 1, looking in the direction of the arrows;

Figure 3 is a fragmentary sectional and elevational view at right angles to Figure 2, this being on the line 3—3 of Figure 2, looking in the direction of the arrows;

Figure 4 is a perspective view of a cover retaining or locking collar.

Referring to the general assemblage seen in Figure 1 of the drawings, the reference character A denotes a tie rod end-member. In practice the end members at the opposite ends of the tie rod (not shown) are the same and each comprises a screw-threaded shank B and a yoke or fork C formed integral therewith. The reference D denotes a conventional-type knuckle arm forming a part of the usual knuckle construction on the front wheel of an automobile or the like. The arm proper is denoted by the reference character E and the eye is denoted at F. The parts A and D are old and are denoted by reference letters to assist in distinguishing same from the improvement, that is the novel connector unit or means 6. This comprises a pair of duplicate casings integrated to take positions at right angles to each other. One case or casing, the one denoted by the numeral 7 is connectible with the tie rod end member A and the other casing, denoted by the numeral 8 is directly connectible with steering arm D. From a specific structural standpoint each part 7 or 8, as the case may be, is the same and a description of one will suffice for both. To this end, each part comprises a cup-like case 9 which is properly apertured to accommodate a connecting stud 10 on the one hand (see Figure 2) and another connecting stud 11 (see Figure 3) on the other hand. A bearing assembly, comprising ball or equivalent anti-friction bearings and races and denoted by the numeral 12 is fitted into the case. A felt washer 13 is interposed between the cup and ball bearing assembly and a similar felt washer 14 is interposed between said assembly and removable cover 15. The cover is in the form of a washer and it is held in place by a horseshoe shaped lock or locking collar 16 having springy detents 17 engageable in suitable keeper means provided in the rim of the cup or case. The latter is provided with a suitable endless or annular shoulder as at 18 to seat said cover. Then, too, the stud 11 is centrally reduced and thus suitably shouldered and one of the shoulders provides an appropriate support for the cover 15.

Referring now to Figure 2 it will be seen that the stud 10 has an assembling head at one end, that the central or hub portion is reduced in diameter as at 19 to provide shoulders and to accommodate the ball bearing assembly. The threaded end portion of the stud 20 is provided with a castellated nut 21 held in place by a cotter pin 22. The end portions of the stud project beyond adjacent surfaces of the ball bearing equipped case and thus serve to accommodate the arms of the fork or yoke in order to provide a suitably hinging connection between the tie rod end member A and part 7 of the connector unit 6.

Referring now to Figure 3 and the stud 11 it will be seen that said stud projects well beyond the casing and is tapered at 23 to accommodate a castellated nut 24 held in place by the threaded end 25 and the associated cotter pin 26. This arrangement, along with the shoulder portion 27 on the stud serves to accommodate the eye F on the knuckle arm E. The upper threaded end of the stud, which goes through and beyond the coacting side of the part 8 is also provided with a castellated nut 29 held in place by a cotter key. The central or intermediate portion of the stud is reduced as at 28 to accommodate the inner ball race. It follows therefore that the connector means 6 is characterized by disc-like casings integral with each other and at right angles to each other, each casing unit having ball bearing or equivalent anti-friction bearing means removably assembled therein the ball bearing means serving to provide bearings for the respective studs, the studs being at right angles to each other and providing a "universal" or two-way connection between the knuckle arm D on the one hand and the end member A of the tie rod on the other hand. This two-way connection possesses what I believe to be requisite facilities to provide an effective linkage between the opposite ends of the tie rod and the coacting front wheel knuckle arms.

It is submitted that a tie rod provided with linkage connectors of the type herein shown and described will be so connected with the complemental knuckle arms that a more durable and safer compensating arrangement will be had. It is believed that the means shown and described is novel, an improvement over similarly functioning linkages, is readily and easily workable, will promote great safety, will endure for the life of the ordinary automobile and will insure smooth and reliable steering results. The means disclosed is further novel in that the elements and parts which are employed may be standardized and produced in quantity lots for reserve and replacement parts, whereby to enable dealers and owners alike to feel that repairs when necessary may be properly and satisfactorily taken care of. It is further submitted that joining connectors of the type covered herein are not only calculated to transmit the necessary loads and handle required forces, but are sufficiently stable and steady that there is very little likelihood that the elements or parts will vibrate and shake apart.

While I have shown the anti-friction bearing units or assemblies as characterized chiefly by balls, it is evident that, in practice, either roller bearings or needle bearings may be substituted for said balls.

A careful consideration of the foregoing description in conjunction with the invention as illustrated in the drawings will enable the reader to obtain a clear understanding and impression of the alleged features of merit and novelty sufficient to clarify the construction of the invention as hereinafter claimed.

Minor changes in shape, size, materials and rearrangement of parts may be resorted to in actual practice so long as no departure is made from the invention as claimed.

Having described the invention what is claimed as new is:

A two-way connector unit adapted to provide a joining and steering connection between one end of a conventional tie-rod and a complemental knuckle arm comprising a connector unit embodying a circular case of cup-like form open on one side, a stud fitted removably and centrally in said case and having a nut equipped screw threaded end on one side of the case, a reduced tapered nut equipped screw threaded end on the opposite side of the case adapted for connection with an eye on a knuckle arm, the intermediate portion of said stud having a plurality of shoulders, a ball bearing unit mounted on the central portion of said stud and confined in said case, a readily applicable and removable cover fitted in and covering the open side of the case and surrounding the stud and engaging one of the shoulders on said stud and held in place by said shoulder, a second cup-like case integral with a marginal portion of the first-named case and disposed at right angles thereto, a second centrally shouldered stud mounted in said second named case, a ball bearing assembly mounted on the shouldered portion of the second stud and fitted in said case, and a cover for the open side of said second named case.

WILLIAM S. CASE.

REFERENCES CITED

The following references are of record in the file of this patent:

UNITED STATES PATENTS

| Number | Name | Date |
| --- | --- | --- |
| 797,267 | Crutchlow | Aug. 15, 1905 |
| 997,376 | Diehl et al. | July 11, 1911 |
| 2,198,744 | Schwemlein | Apr. 30, 1940 |